UNITED STATES PATENT OFFICE.

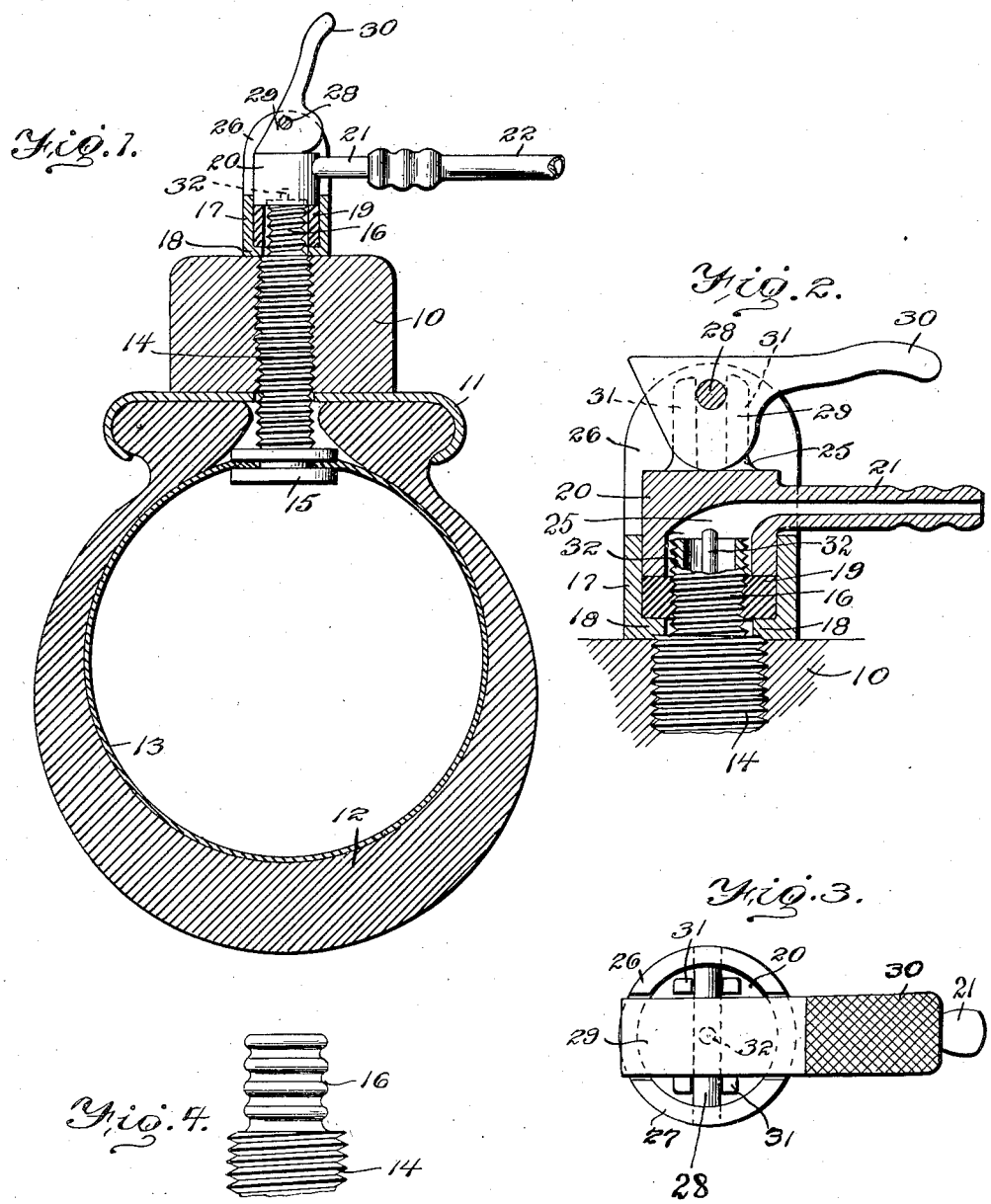

REGINALD F. HERSEY, OF BEVERLY, MASSACHUSETTS.

PNEUMATIC-TIRE PUMP-COUPLING.

1,047,409.   Specification of Letters Patent.   Patented Dec. 17, 1912.

Application filed January 6, 1912. Serial No. 669,900.

*To all whom it may concern:*

Be it known that I, REGINALD F. HERSEY, a citizen of the United States, residing at Beverly, in the county of Essex and State of Massachusetts, have invented certain new and useful Improvements in Pneumatic-Tire Pump-Couplings, of which the following is a specification.

This invention relates to the air valves of pneumatic tires and similar devices, and has for one of its objects to provide an improved means whereby the air pump may be connected to the intake valve.

Another object of the invention is to provide a device of this character whereby the coupling and uncoupling may be instantaneously accomplished.

With these and other objects in view, the invention consists in certain novel features of construction as hereafter shown and described.

The improved device may be employed wherever a supply pipe is to be coupled to and uncoupled from a device of any character, but is more particularly designed for use in connection with the pneumatic tires of automobiles, bicycles and similar vehicles, and for the purpose of illustration is shown applied to the pneumatic tire and wheel of an automobile, and in the drawings illustrative of the preferred embodiment of the invention: Figure 1 represents a transverse section of a conventional automobile felly rim and tire including the air valve whereby the air pressure is supplied to the tire with the improved device applied and partly in section, and with the operating cam in released position; Fig. 2 is an enlarged sectional view of the upper portion of the device showing the operating cam in its downward or closed position; Fig. 3 is a plan view of the parts shown in Fig. 2; Fig. 4 is a detail view illustrating a slight modification in the construction.

Corresponding and like parts are referred to in the following description and indicated in all the views of the drawings by the same reference characters.

In the drawings a portion of a conventional automobile wheel is shown in which 10 represents the felly, 11 the rim, 12 the outer tire member, 13 the inner or inflatable tube, 14 the main externally threaded stock of the valve casing which is threaded through the rim and felly and provided with the enlarged flanged inner end 15 and bearing against the inner face of the inflatable tube and projecting at its inner reduced end 16 beyond the inner face of the felly. In the stock or casing member 10 as ordinarily constructed, the reduced portion 16 is likewise threaded to receive the coupling member of the air supply pipe, and the improved device which is the subject of the present application is adapted to be attached to this reduced threaded portion, so that the improved device may be applied to automobiles already in use. But when the member 14 is constructed with special reference to receiving the improved coupling device, the reduced terminal 16 may be formed with one or more slightly depressed annular channels as shown in Fig. 4 or otherwise formed with an irregular outer surface.

The improved device comprises a tubular shell or casing 17 having an inwardly directed rib or flange 18 at the lower end, the inner diameter of the flange bearing relatively close to the reduced portion 15 of the valve stock. By this means a seat is formed to receive a yieldable or compressible member 19 of rubber or like material which in its uncompressed condition fits readily over the reduced portion 16 of the stock and is shorter than the reduced portion 16, as shown.

Slidably disposed within the shell 17 is a piston or head member 20 from one side of which a tube 21 extends, the latter arranged to receive the hose 22 leading to the air pump, the pump not being shown as it forms no part of the present invention. At its lower end the member 20 is hollow and fits over the reduced portion 16 of the stock and bears constantly upon the compressible member 19. The opening through the tube 21 lends downwardly at its inner end as shown at 25 within the head 20 and communicates with the interior of the head. At its upper end the shell 17 is formed with spaced ears 26—27 between which the tube 21 extends.

Pivoted at 28 between the ears 26—27 is a cam device 29 having an operating handle 30 extending therefrom. The cam is arranged to operate to depress the head 20 together with the tube 21 when disposed in one position as shown in Fig. 2. The head 20 is provided with vertically extending guide lugs 31 which extend upon opposite sides of the pivot pin 28 and thus prevent oscillating movement of the head, while at the same time permitting it to move freely upwardly and downwardly under the influence of the cam. The compressible member 19 possesses sufficient resiliency to maintain the head 20 and its tube 21 in elevated position with the head free from the valve stem indicated at 32, and at the same time free to be readily removed from or disposed over the reduced terminal 16 of the stock. Then when the handle 30 is depressed into position substantially parallel to the tube 21 as shown in Fig. 2, the cam 29 depresses the head 20 and causes the head to compress the flexible member 19 and cause the latter to closely engage around the reduced portion 19 and firmly lock the shell 17 and its attachments to the stock. By this means a single downward movement of the lever 30 couples the shell 17 and its attachments to the stock and a single upward movement of the lever uncouples and releases the pump.

The improved device is simple in construction and can be inexpensively manufactured and applied without material structural changes to valve stocks of various forms.

Having thus described the invention, what is claimed as new is:

A device of the class described comprising a shell having upwardly directed ears and adapted to be disposed over a valve stock and its valve, a pivot pin extending through said ears, a compressible member within said shell, a head slidable within said shell and in contact with said compressible member, guide lugs rising from said head and bearing upon opposite sides of said pivot pin, said head having means for connecting to the conductor of an air pump, a cam device swinging upon said pivot pin and engaging said head between said guide lugs to cause said head to engage said compressible member.

In testimony whereof I affix my signature in presence of two witnesses.

REGINALD F. HERSEY. [L. S.]

Witnesses:
   CARL P. FORD,
   ERVIN S. BEAN.